(12) United States Patent
Wang et al.

(10) Patent No.: US 10,877,773 B2
(45) Date of Patent: Dec. 29, 2020

(54) DISTRIBUTION OF A SOFTWARE CLIENT APPLICATION TOWARDS A CLIENT COMPUTING DEVICE

(71) Applicant: Deutsche Telekom AG, Bonn (DE)

(72) Inventors: Hao Wang, Bonn (DE); Stefan Burkert, Bonn (DE); Marcus Mueller-Jung, Duisburg (DE); Sebastian Weik, Darmstadt (DE)

(73) Assignee: DEUTSCHE TELEKOM AG, Bonn (DE)

( * ) Notice: Subject to any disclaimer, the term of this patent is extended or adjusted under 35 U.S.C. 154(b) by 115 days.

(21) Appl. No.: 15/794,009

(22) Filed: Oct. 26, 2017

(65) Prior Publication Data

US 2018/0121219 A1 May 3, 2018

(30) Foreign Application Priority Data

Oct. 29, 2016 (EP) .................................... 16196490

(51) Int. Cl.
*G06F 9/44* (2018.01)
*G06F 9/445* (2018.01)
*H04W 4/50* (2018.01)
*H04L 29/08* (2006.01)
*H04W 8/18* (2009.01)
*G06F 8/60* (2018.01)

(52) U.S. Cl.
CPC .......... *G06F 9/44505* (2013.01); *H04L 67/34* (2013.01); *H04W 4/50* (2018.02); *H04W 8/18* (2013.01); *G06F 8/60* (2013.01); *H04L 67/10* (2013.01)

(58) Field of Classification Search
CPC ..... G06F 1/32; G06F 1/26; G06F 1/28; G06F 9/44
See application file for complete search history.

(56) References Cited

U.S. PATENT DOCUMENTS

| 6,996,599 | B1 * | 2/2006 | Anders | G06F 8/61 |
| | | | | 707/E17.032 |
| 7,770,167 | B1 * | 8/2010 | Weathersby | G06F 8/63 |
| | | | | 717/174 |
| 8,260,978 | B1 | 9/2012 | Thompson et al. | |
| 9,147,066 | B1 * | 9/2015 | Tian | G06F 21/572 |
| 2002/0107809 | A1 * | 8/2002 | Biddle | G06Q 10/10 |
| | | | | 705/59 |
| 2003/0233547 | A1 * | 12/2003 | Gaston | G06F 21/10 |
| | | | | 713/168 |

(Continued)

*Primary Examiner* — Keshab R Pandey
(74) *Attorney, Agent, or Firm* — Leydig, Voit & Mayer, Ltd.

(57) ABSTRACT

A method for improved distribution of a software client application includes: in a first step, an initializing software application is transmitted to a client computing device, wherein the initializing software application is related to the software client application and corresponds to a preliminary part of the software client application; and in a second step subsequent to the first step and upon being requested by the initializing software application, software code of the software client application is transmitted to the client computing device in view of the software client application being installed and/or activated on the client computing device in order to provide the cloud-based communication service.

10 Claims, 1 Drawing Sheet

(56) References Cited

U.S. PATENT DOCUMENTS

| | | | |
|---|---|---|---|
| 2004/0177135 A1 | 9/2004 | Monaton et al. | |
| 2005/0055687 A1* | 3/2005 | Mayer | G06F 8/65 |
| | | | 717/173 |
| 2005/0235282 A1 | 10/2005 | Anderson | |
| 2006/0031205 A1* | 2/2006 | Perkins | G06F 16/9566 |
| 2006/0073820 A1* | 4/2006 | Craswell | G06F 8/65 |
| | | | 455/419 |
| 2009/0106201 A1* | 4/2009 | White | G06F 16/958 |
| 2009/0292791 A1* | 11/2009 | Livshits | G06F 9/451 |
| | | | 709/217 |
| 2010/0023788 A1* | 1/2010 | Scott | G06F 1/3209 |
| | | | 713/320 |
| 2012/0088540 A1* | 4/2012 | Smith | H04W 8/24 |
| | | | 455/550.1 |
| 2013/0117089 A1* | 5/2013 | Pachikov | G06Q 30/02 |
| | | | 705/14.26 |
| 2015/0149994 A1* | 5/2015 | Adachihara | G06F 8/61 |
| | | | 717/178 |
| 2015/0220245 A1* | 8/2015 | Wojcik | G06F 8/61 |
| | | | 715/745 |

* cited by examiner

DISTRIBUTION OF A SOFTWARE CLIENT APPLICATION TOWARDS A CLIENT COMPUTING DEVICE

CROSS-REFERENCE TO RELATED APPLICATIONS

Priority is claimed to European Patent Application No. EP 16196490.3, filed on Oct. 29, 2016, the entire disclosure of which is hereby incorporated by reference herein.

FIELD

The present invention relates to a method for improved distribution of a software client application, using a telecommunications network, towards a client computing device in view of software code of the software client application being executed by the client computing device as part of a cloud-based communication service being provided by the telecommunications network or being provided using the telecommunications network.

The present invention further relates to a system for improved distribution of a software client application, using a telecommunications network, towards a client computing device in view of software code of the software client application being executed by the client computing device as part of a cloud-based communication service being provided by the telecommunications network or being provided using the telecommunications network.

Additionally, the invention relates to a telecommunications network for improved distribution of a software client application towards a client computing device in view of software code of the software client application being executed by the client computing device as part of a cloud-based communication service being provided by the telecommunications network or being provided using the telecommunications network.

Furthermore, the invention relates to a program comprising a computer readable program code and to a computer program product for improved distribution of a software client application, using a telecommunications network, towards a client computing device in view of software code of the software client application being executed by the client computing device as part of a cloud-based communication service.

BACKGROUND

Nowadays, user equipments or client computing devices, such as mobile phones, tablet computers, or the like, are typically handed over to a client or to a user of such devices with a number of applications or software modules already installed on it. Such clients or users (also called mobile users) typically need guidance as to which applications or software modules (also called mobile apps) are to be installed for a specifically booked cloud service, especially in the context of providing software as a service (SaaS). It would be desirable that a complete list of required software applications or software modules would already be preinstalled on the client computing device at a time the client computing device is handed over to the client or user. However, using such preinstallation would either require a lot of memory space within the client computing device (in case that any possible software application or software module is preinstalled on the client computing device) or it would be less customer-specific (in case that only a part of the software applications or software modules are preinstalled on the client computing device).

SUMMARY

In an exemplary embodiment, the present invention provides a method for improved distribution of a software client application, using a telecommunications network, towards a client computing device in view of software code of the software client application being executed by the client computing device as part of a cloud-based communication service being provided by the telecommunications network or being provided using the telecommunications network. The client computing device comprises an enabling software application, wherein the enabling software application is used in the distribution of the software client application to the client computing device. The method comprises the following steps: in a first step, an initializing software application is transmitted to the client computing device, wherein the initializing software application is related to the software client application and corresponds to a preliminary part of the software client application; and in a second step subsequent to the first step and upon being requested by the initializing software application, the software code of the software client application is transmitted to the client computing device in view of the software client application being installed and/or activated on the client computing device in order to provide the cloud-based communication service.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Exemplary embodiments of the present invention provide a cost effective solution for improved distribution of a software client application towards a client computing device in view of software code of the software client application being executed by the client computing device as part of a cloud-based communication service being provided by a telecommunications network (or being provided using the telecommunications network), such that the software applications or software modules on the client computing device are as much as possible user-specific and tailored to the needs or requirements of the user or customer.

In an exemplary embodiment, the present invention provides a method for improved distribution of a software client application, using a telecommunications network, towards a client computing device in view of software code of the software client application being executed by the client computing device as part of a cloud-based communication service being provided by the telecommunications network or being provided using the telecommunications network, wherein the client computing device comprises an enabling software application, the enabling software application being used in the distribution of the software client application to the client computing device, wherein the method comprises the following steps:

- in a first step, an initializing software application is transmitted to the client computing device, the initializing software application being related to the software client application and corresponding to a preliminary part of the software client application,
- in a second step subsequent to the first step and upon being requested by the initializing software application, the software code of the software client application is transmitted to the client computing device in view of the software client application being installed and/or activated on the client computing device in order to provide the cloud-based communication service.

According to the present invention, it is thereby advantageously possible that a personalization (i.e., a user-specific or customer-specific configuration) of the software applications and/or software modules of the client computing device is comparatively easily possible. The configuration of the software applications and/or software modules should be customer-specific, as each customer shall be able to book software services out of a variety of different possibilities regarding software as a service (SaaS). Typically, this is done using user profile information: Based on different user profiles (or user profile information), a network operator and/or a service provider is able to deploy certain software applications (or software apps) to the client computing device (i.e., the user's device).

According to conventionally known methods, providing such a user-specific configuration of software applications (or software apps) is not easy as service providers or network operators typically do not natively have—at least not beforehand—information about the device used by the customer or user (i.e., the client computing device) as well as the profile linked to it.

In contrast, according to the present invention, it is advantageously possible that additional service can be provided as software as a service (SaaS services) to customers in a bundled fashion, especially with mobile (data) tariffs, and in a flexible manner. Thereby, the respective software applications (or mobile apps)—corresponding to the software as a service subscription or bundle—are installed on the respective client computing device used by a user or client (or on the respective client computing devices of a group of users or customers having chosen that considered software as a service subscription or bundle) depending on the actual software as a service booking of the customer. This is in contrast to conventional methods of providing software modules on a client computing device, consisting in preinstalling all such software applications (or mobile apps) for all possibly bookable services—resulting typically not only in customers being bewildered (and, hence, potentially leading to a poor user experience) but also in a waste of (memory) space on user devices or client computing devices.

According to the present invention, improved distribution of software client applications is advantageously possible. The assumption is that the client computing device comprises an enabling software application which is used in the distribution of the software client application towards the client computing device. The enabling software application is generally not specific to the user profile information. It might be specific to the platform of the client computing device and/or to the model of the client computing device, but it is typically not customer-specific or client specific. According to an exemplary embodiment of the inventive method, an initializing software application is transmitted—in a first step—to the client computing device. The initializing software application is related to the software client application and corresponds to a preliminary part of the software client application. In a second step subsequent to the first step and upon being requested by the initializing software application, the software code of the software client application is transmitted to the client computing device in view of the software client application being installed and/or activated on the client computing device in order to provide the cloud-based communication service.

According to the present invention, it is advantageously possible that a service provider or a network operator is able to deploy a software application (i.e., an app or a software client application) for a customer (e.g., a business customer), e.g., at a time when the subscriber identity module (often realized as a SIM-card) is inserted into the client computing device.

According to an embodiment of the present invention, the method comprises a third step subsequent to the second step, wherein the initializing software application is removed from the client computing device after installation and/or activation of the software client application on the client computing device, wherein the removal of the initializing software application is especially performed by the enabling software application, especially upon a removal request received, by the enabling software application, from the initializing software application.

By removing the initializing software application after the corresponding software client application is installed and/or activated, it is advantageously possible to save memory space on the client computing device.

According to a further embodiment of the present invention, the enabling software application is related to a first server entity, and wherein the initializing software application is transmitted, to the client computing device, by the first server entity, especially upon a request from the enabling software application.

By using the first server entity—related to the enabling software application—it is advantageously possible to provide a central distribution point for both the enabling software application and the initializing software application. For example, the provider of the software client application (i.e., the one to be transmitted to the client computing device and installed and/or activated on the client computing device in the context of a customer-specific software as a service scenario) would also provide the initializing software application to the provider of the enabling software application, typically a network operator of the telecommunications network or mobile communication network. Hence, according to the embodiment of the present invention, according to which the initializing software application is transmitted by the first server entity, it is typically the provider of the enabling software application (normally the network operator) that is also distributing the initializing software application. However, according to an alternative embodiment of the present invention, it is also possible that the initializing software application is transmitted, to the client computing device, by a second server entity, typically associated with the provider of the software client application, or associated to a third party, often an application distribution entity such as, e.g., an application store (appstore) or an application marketplace.

According to still a further embodiment of the present invention, the initializing software application is related to a second server entity (typically associated with the provider of the software client application, or associated to a third party, often an application distribution entity such as, e.g., an application store (appstore) or an application marketplace, and wherein the software client application is transmitted, to the client computing device, by the second server entity, especially upon a further request from the initializing software application.

By using the second server entity—related to the initializing software application and/or to the software client application—it is advantageously possible to provide a separated distribution point for the enabling software application (i.e., the first server entity) and for the software client application (i.e., the second server entity). According to different embodiments of the present invention, the initializing software application might be provided or transmitted, to the client computing device, by the first server entity, or by the second server entity. It is also possible and preferred according to the present invention, that the distribution of the initializing software application (and/or of the software client application) is provided in a flexible manner such that:

for a first specific software client application, the corresponding (first) initializing software application (and/or the corresponding (first) software client application) is transmitted by the first server towards the client computing device, and for a second specific software client application (different from the first specific software client application), the corresponding (second) initializing software application (and/or the (second) corresponding software client application) is transmitted by the second server towards the client computing device.

According to a further embodiment of the present invention, subsequent to the first step and prior to the second step, a verification step regarding a user profile information is performed (especially by or involving the initializing software application), the user profile information being associated with the client computing device and/or associated with a subscriber identity module within or embedded in the client computing device, wherein the transmission of the software code of the software client application to the client computing device is performed only in case that the verification regarding the user profile yields a corresponding result (i.e., confirming that the software client application is required).

Via the verification step, it is advantageously possible according to the present invention that the software configuration (or configuration of software client applications or apps of the client computing device) corresponds to the user profile information, i.e., especially to the chosen apps or services of the user or customer.

According to still a further embodiment of the present invention, subsequent to the first step and prior to the second step, a further verification step (either in addition to the verification step or instead of the verification step related to the user profile information) is performed (especially by or involving the initializing software application), wherein the further verification step relates to whether the software client application is to be installed and/or is to be started after installation on the client computing device and/or whether a user of the client computing device is to be informed to contact an application distribution entity to distribute the software client application, wherein the transmission of the software code of the software client application to the client computing device is performed only in case that the further verification step yields a corresponding result, wherein the further verification step especially involves a local check or verification on the client computing device or a check or verification at the first and/or second server entity.

Via the further verification step (being related to either one or to both of the variants according to whether the software client application is to be installed and/or is to be started after installation on the client computing device and/or to whether a user of the client computing device is to be informed to contact an application distribution entity to distribute the software client application) it is advantageously possible according to the present invention to perform the installation and/or the launch of the software client application and/or the contact towards an application distribution entity in dependency of the result of the further verification step. Especially, the further verification step comprises a check or (a multitude of) checks related to, e.g., whether a set-up wizard (of the client computing device; the set-up wizard being typically on the first boot operation of the client computing device in order to guide the user through) is finished during the first boot operation of the client computing device. According to a preferred embodiment of the present invention, the logic implemented in the initializing software application (in order to perform the verification step and/or the further verification step) provides a comparatively high level of flexibility.

According to a further embodiment of the present invention, the enabling software application is sufficiently authorized to install and/or activate the initializing software application and the software client application on the client computing device, wherein especially the enabling software application is authorized to perform a silent installation of the initializing software application and/or of the software client application, and/or the enabling software application automatically activates the software client application after the software client application is transmitted to the client computing device and installed.

According to still a further embodiment of the present invention, an authentication of the initializing software application and/or of the software client application is performed, especially by the enabling software application, prior to an installation and/or activation of the respective software component, wherein the authentication is especially performed based on an application certificate of the initializing software application and/or of the software client application.

Thereby, it is advantageously possible according to the present invention that the steps of transmitting and installing software components and/or software modules on the client computing device are performed in an effective and especially in a protected manner.

Furthermore, the present invention relates to a system for improved distribution of a software client application, using a telecommunications network, towards a client computing device in view of software code of the software client application being executed by the client computing device as part of a cloud-based communication service being provided by the telecommunications network or being provided using the telecommunications network, wherein the system comprises the telecommunications network and the client computing device, wherein the client computing device comprises an enabling software application, the enabling software application being used in the distribution of the software client application to the client computing device, wherein the system is configured such that:
 an initializing software application is transmitted to the client computing device, the initializing software application being related to the software client application and corresponding to a preliminary part of the software client application,
 upon being requested by the initializing software application, the software code of the software client application is transmitted to the client computing device in view of the software client application being installed and/or activated on the client computing device in order to provide the cloud-based communication service.

Via such a system, it is advantageously possible according to the present invention that a personalization (i.e., a user-specific or customer-specific configuration) of the software applications and/or software modules of the client computing device is comparatively easily possible.

Additionally, the present invention relates to a telecommunications network for improved distribution of a software client application towards a client computing device in view of software code of the software client application being executed by the client computing device as part of a cloud-based communication service being provided by the telecommunications network or being provided using the telecommunications network, wherein the client computing device comprises an enabling software application, the enabling software application being used in the distribution of the software client application to the client computing device, wherein the telecommunications network is configured such that:
 an initializing software application is transmitted to the client computing device, the initializing software application being related to the software client application and corresponding to a preliminary part of the software client application,
 upon being requested by the initializing software application, the software code of the software client application is transmitted to the client computing device in view of the software client application being installed and/or activated on the client computing device in order to provide the cloud-based communication service.

Via such a telecommunications network, it is advantageously possible according to the present invention that a personalization (i.e., a user-specific or customer-specific configuration) of the software applications and/or software modules of the client computing device is comparatively easily possible.

Furthermore, the present invention relates to a client computing device for improved distribution of a software client application, using a telecommunications network, towards the client computing device in view of software code of the software client application being executed by the client computing device as part of a cloud-based communication service being provided by the telecommunications network or being provided using the telecommunications network, wherein the client computing device comprises an enabling software application, the enabling software application being used in the distribution of the software client application to the client computing device, wherein the client computing device is configured such that:
 an initializing software application is transmitted to the client computing device, the initializing software application being related to the software client application and corresponding to a preliminary part of the software client application,
 upon being requested by the initializing software application, the software code of the software client application is transmitted to the client computing device in view of the software client application being installed and/or activated on the client computing device in order to provide the cloud-based communication service.

Via such a client computing device, it is advantageously possible according to the present invention that a personalization (i.e., a user-specific or customer-specific configuration) of the software applications and/or software modules of the client computing device is comparatively easily possible.

Furthermore, the present invention relates to a program comprising a computer readable program code which, when executed on a computer or on a client computing device, especially as part of an enabling software application and/or as part of an initializing software application and/or as part of a software client application, or on a first server entity or on a second server entity, or in part on a client computing device and/or in part on a first server entity and/or in part on a second server entity, causes the computer and/or the client computing device and/or the enabling software application and/or the initializing software application and/or the software client application and/or the first server entity and/or the second server entity to perform an exemplary embodiment of an inventive method.

Still additionally, the present invention relates to computer program product for providing an enhanced level of authentication related to a secure software client application provided by an application distribution entity, the computer program product comprising a computer program stored on a storage medium, the computer program comprising program code which, when executed on a computer or on a client computing device, especially as part of an enabling software application and/or as part of an initializing software application and/or as part of a software client application, or on a first server entity or on a second server entity, or in part on a client computing device and/or in part on a first server entity and/or in part on a second server entity, causes the computer and/or the client computing device and/or the enabling software application and/or the initializing software application and/or the software client application and/or the first server entity and/or the second server entity to perform an exemplary embodiment of an inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1:
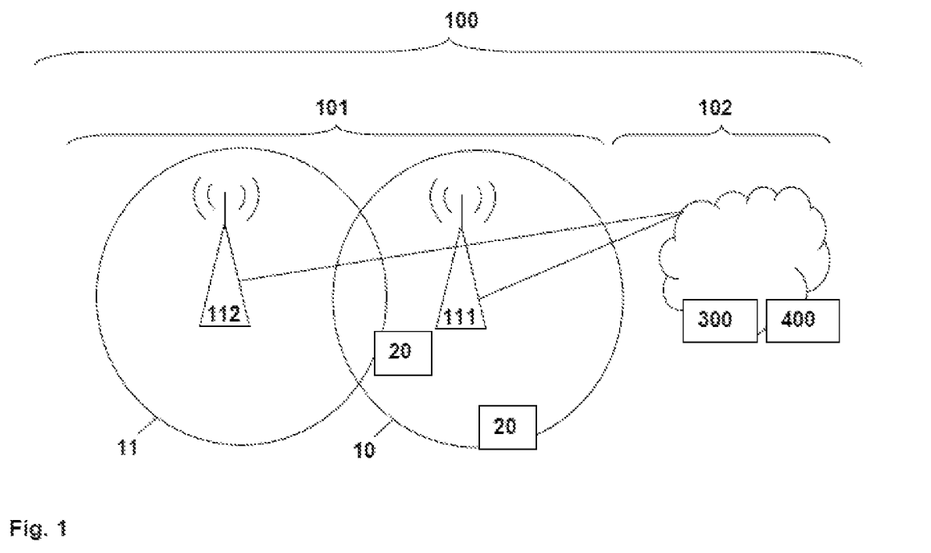
FIG. 1 schematically illustrates a mobile communication network as an example of a telecommunications network according to the present invention, wherein the mobile communication network comprises an access network and a core network, as well as a plurality of user equipments as examples of client computing devices.

In FIG. 1, a mobile communication network 100 (or a public land mobile network) is schematically shown as an example of a telecommunications network according to the present invention, the mobile communication network 100 comprising an access network 101 and a core network 102, as well as a plurality of user equipments 20 as examples of client computing devices. As schematically shown in FIG. 1, the telecommunications network is preferably a cellular mobile communication network comprising (typically a multitude of) radio cells, two of which being schematically represented via circles and reference signs 10 (regarding a first radio cell), and 11 (regarding a second radio cell). The circles indicate the radio coverage area of the corresponding radio cells 10, 11. The radio coverage within the radio cells 10, 11 is provided via base station entities, wherein each radio cell 10, 11 comprises or is served by at least one base station entity. In FIG. 1, a first base station entity 111, serving the first radio cell 10, and a second base station entity 112, serving the second radio cell 11, are schematically shown. The core network 102 is only schematically represented via a cloud representation in FIG. 1. A first server entity 300 and a second server entity 400 are shown in FIG. 1, wherein in the exemplary embodiment of FIG. 1, the first server entity 300 and the second server entity 400 are part of the core network 102; however, the first and/or second server entities 300, 400 do not need to be part of the core network 102 of the telecommunications network; it is possible that one or both of the first server entity 300 and/or the second server entity 400 is/are only associated with the telecommunications network (and not part of it); however, the first and second server entities are accessible through the telecommunications network. The user equipments 20 or client computing devices are connected to the telecommunications network using the radio cells 10, 11.

Figure 2:
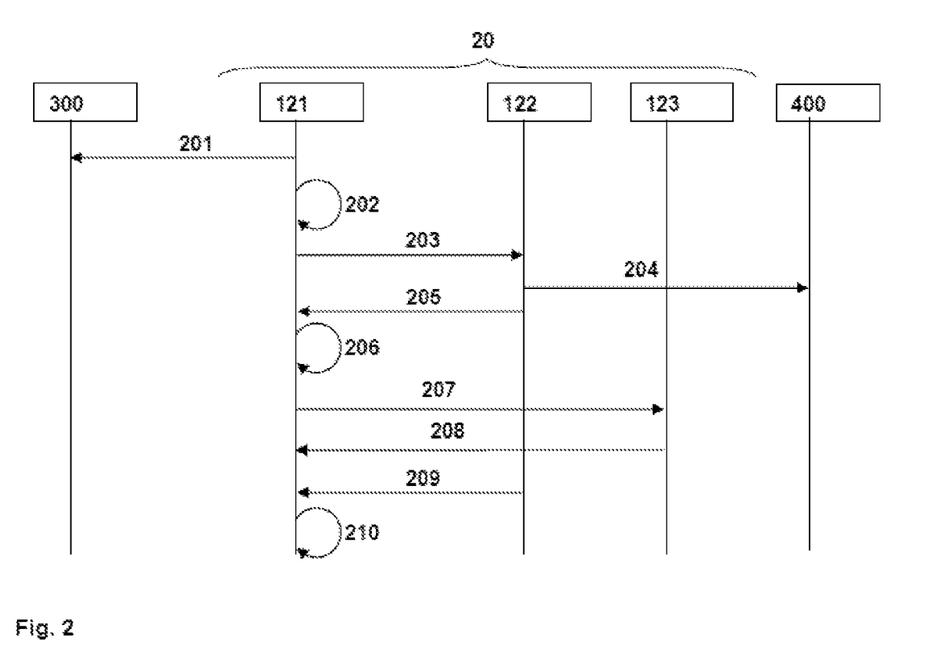
FIG. 2 schematically illustrates a communication diagram related to an embodiment of the present invention, especially related to transmitting the initializing software application to the client computing device, and to transmitting the software code of the software client application to the client computing device in view of the software client application being installed and/or activated on the client computing device in order to provide a cloud-based communication service.

According to the present invention, a method for improved distribution of a software client application 123 is suggested. The client computing device comprises an enabling software application 121 that is used in the distribution of the software client application 123 to the client computing device. A communication diagram related to the present invention, especially related to an exemplary embodiment of the inventive method, is shown in FIG. 2. The communication diagram is related to transmitting an initializing software application 122 to the client computing device, and to transmitting the software code of the software client application 123 to the client computing device in view of the software client application 123 being installed and/or activated on the client computing device in order to provide a cloud-based communication service. The initializing software application 122 is related to the software client application 123 and corresponds to a preliminary part (or first part) of the software client application 123; hence the initializing software application 122 is also called a "stub" of the software client application 123. The communication diagram schematically shows an embodiment of the method according to the present invention with the first server entity 300, the client computing device, and the second server entity 400.

In a first processing step 201, the initializing software application 122 (related to the software client application 123) is downloaded towards the client computing device. The first processing step 201 schematically shows the client computing device requesting (especially via a request from the enabling software application 121) the initializing software application 122 from the first server entity 300. In a second processing step 202, the initializing software application 122 (or stub app) is installed on the client computing device. The communication diagram shown in FIG. 2 shows a situation assuming that the client computing device already comprises the enabling software application 121. As the enabling software application 121 is not dependent on the user-specific configuration of the software as a service applications (but—perhaps—only on the hardware model and/or platform of the client computing device), the enabling software application 121 is easily able to be preinstalled on all or at least all similar client computing devices (irrespective of which specific user or client will be using a specific device). In a third processing step 203, the initializing software application 122 is activated, especially under the control of the enabling software application 121, as indicated in FIG. 2. After the initializing software application 122 having been activated or instantiated on the client computing device, it is possible to implement a verification or checking logic being specific to the client computing device and/or to the user or client using the considered client computing device and/or to the user profile information of the user or client and/or to the considered software client application 123 in question. In a fourth processing step 204, it is checked—especially by the initializing software application 122—if the software client application 123 (corresponding to the initializing software application 122) needs to be installed. In a fifth processing step 205 (and, of course, only in case that the check or verification yields a corresponding result), the software client application 123 is downloaded (from the second server entity 400 (and/or from the initializing software application 122, especially via a further request) according to the exemplary embodiment shown in FIG. 2), and a request is sent (to the enabling software application 121) to install the software client application 123 in a sixth processing step 206. In a seventh processing step 207, the software client application 123 is activated and/or instantiated (within the client computing device), especially via the enabling software application 121, with the possibility (for the activated and/or instantiated software client application 123)—in an eighth processing step 208—to send one or a plurality of requests to perform privileged actions. In a ninth processing step 209, the initializing software application 122 is requested to be removed, especially via a removal request (especially from the initializing software application 122 itself), the removal request being especially received by the enabling software application 121. In a tenth processing step 210, the initializing software application 122 is removed, especially by the enabling software application 121.

Hence, in a first step, the initializing software application 122 is transmitted to the client computing device, wherein the initializing software application 122 is related to the software client application 123. In a second step subsequent to the first step and upon being requested by the initializing software application 122, the software code of the software client application 123 is transmitted to the client computing device in view of the software client application 123 being installed and/or activated on the client computing device in order to provide the cloud-based communication service, especially a service in the context of software as a service. Thus, embodiments of the present invention proposes to use the enabling software application 121 and the initializing software application 122 (i.e. two apps) to help deploying a full app or application (i.e. the software client application 123) on the client computing device. The enabling software application 121, having typically system permissions, is pre-installed on all devices with a minimum of footprint (especially relating to the management of different versions or different subscription profiles or different client computing devices), whereas it is the initializing software application 122 that implements the logic to check if a certain app (software client application 123) is needed. In background, with certain triggers like "device first run" or "SIM changed", the enabling software application 121 can install the initializing software application 122 and trigger it to run the logic to install the full app (or software client application 123) or not. The initializing software application 122 is preferably able to delete itself after the whole process is done. It is especially preferred that all privileged actions (like silent installation or the like) are done by the enabling software application 121. If requests from the initializing software application 122 and the full app (software client application 123) are validated, the enabling software application 121 can install different initializing software applications 122 (or stub apps) to handle requirements from (different) service providers. Hence, an app (initializing software application 122) is provided that checks the user profile to decide if the partner application (or software client application 123) is needed, so that the service can be delivered to the user on the fly. Hence, according to the present invention it is possible to handle different service provider requirements by corresponding stub apps and partner apps so there is no central integration but flexible distribution.

According to the present invention, the enabling software application 121 especially corresponds to a component on the client computing device with system permissions, e.g., the enabling software application 121 is authorized to install apps or applications, change settings, etc. The enabling software application 121 furthermore is able to download and install the initializing software application 122 (or stub app), optionally based on the device model of the client computing device and/or based on the mobile country code (MCC) and/or based on the mobile network code (MNC) and/or based on other information available on the client computing device. According to the present invention, it is the initializing software application 122 (or stub app) that implements the business logic based on, e.g., the user profile to see if the software client application 123 (or partner app) is needed, wherein a communication with the partner server (i.e. the second server entity 400, being related with the software client application 123) is often performed. If yes, i.e. if the check yields a corresponding result, then the initializing software application 122 downloads the software client application 123 (or partner app) and/or installs the software client application 123 (or partner app). Advantageously and preferably, the initializing software application 122 should delete itself after the process is finished. Normally, the initializing software application 122 (or stub app) has no user interface and runs in the background on the client computing device. Thereafter, the software client application 123 (or partner app)—normally comprising a user interface—guides the user for application installation or further customization. The activation of the software client application 123 (or partner app)—especially the automatic activation of the software client application 123 after installation, providing the possibility for the software client application 123 to prepare itself for launch—is preferably done by the enabling software application 121 but might also be done by the initializing software application 122. According to the present invention, it is up to the service provider or the service vendor to define and split the logic between the initializing software application 122 (or stub app) and the full app to deliver a full user experience. It is preferred according to the present invention, that both the initializing software application 122 (or stub app) and the software client application 123 (or partner app) are sufficiently authorized by the enabling software application 121 in a way that only requests from them are accepted by the enabling software application 121. For example, when using the Android mobile operating system, the public key of the application certificate is checked at runtime by the enabling software application 121, the list of allowed apps or applications is received from the first server entity 300 (or enabler server) and stored in a safe place on the client computing device. Advantageously, the enabling software application 121 can install several stub apps from different service providers to handle their requirements separately, without integrating all the logic in the enabling software application 121.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for distribution of a software client application, using a telecommunications network, to a client computing device, comprising:
   requesting, by an enabling software application of the client computing device, an initializing software application from a first server entity, wherein the enabling software application is independent of a user-specific configuration for software as a service (SaaS) applications;

receiving, by the client computing device, the initializing software application from the first server entity, wherein the initializing software application corresponds to a preliminary part of the software client application; and downloading, by the client computing device, based on a request from the initializing software application, software code of the software client application for installing and/or activating the software client application on the client computing device, wherein the software client application facilitates provision of an SaaS service to the client computing device;

wherein transmission of the initializing software application to the client computing device is based on the hardware and/or software configuration of the client computing device, and wherein the hardware and/or software configuration of the client computing device is checked by the enabling software application, wherein an authentication of the initializing software application and/or of the software client application is performed, by the enabling software application, prior to an installation and/or activation of the initializing software application and/or the software client application, wherein the authentication is performed based on an application certificate of the initializing software application and/or of the software client application.

2. The method according to claim 1, further comprising:
removing the initializing software application from the client computing device after installation and/or activation of the software client application on the client computing device.

3. The method according to claim 2, wherein the removal of the initializing software application is performed by the enabling software application, upon a removal request received, by the enabling software application, from the initializing software application.

4. The method according to claim 1, wherein the software code of the software client application is downloaded by the client computing device from a second server entity.

5. The method according to claim 1, wherein the hardware and/or software configuration of the client computing device is checked based on trigger information relating to a first run of the client computing device, and/or based on trigger information relating to an exchange of a subscriber identity module of the client computing device.

6. The method according to claim 1, further comprising:
before downloading the software code of the software client application, performing a verification with regard to user profile information associated with the client computing device and/or associated with a subscriber identity module of the client computing device;

wherein downloading the software code of the software client application is performed in response to successful verification.

7. The method according to claim 1, wherein, before downloading the software code of the software application, the method further comprises:
performing a verification, wherein the verification comprises: determining whether the software client application is to be installed and/or is to be started after installation on the client computing device; and/or determining whether a user of the client computing device is to be informed to contact an application distribution entity to distribute the software client application;

wherein downloading the software code of the software client application is performed in response to successful verification; and wherein performing the verification further includes a local check or verification on the client computing device or a check or verification at the first server entity and/or at a second server entity.

8. The method according to claim 1, wherein the enabling software application is authorized to install and/or activate the initializing software application and the software client application on the client computing device, wherein:
the enabling software application is authorized to perform a silent installation of the initializing software application and/or of the software client application; and/or the enabling software application automatically activates the software client application after the software client application is installed.

9. A system for distribution of a software client application, using a telecommunications network, to a client computing device, wherein the system comprises:
a first server entity; and
the client computing device, wherein the client computing device comprises an enabling software application;

wherein the enabling software application of the client computing device is configured to: request an initializing software application from the first server entity, wherein the enabling software application is independent of a user-specific configuration for software as a service (SaaS) applications;

wherein the first server entity is configured to: in response to the request from the enabling software application of the client computing device, transmit the initializing software application to the client computing device, wherein the initializing software application corresponds to a preliminary part of the software client application; and wherein the client computing device is configured to: download, based on a request from the initializing software application, software code of the software client application for installing and/or activating the software client application on the client computing device, wherein the software client application facilitates provision of an SaaS service to the client computing device;

wherein transmission of the initializing software application to the client computing device is based on the hardware and/or software configuration of the client computing device, and wherein the client computing device is configured to check the hardware and/or software configuration of the client computing device;

wherein the enabling software application is further configured to perform, prior to an installation and/or activation of the initializing software application and/or the software client application, an authentication of the initializing software application and/or of the software client application, wherein the authentication is performed based on an application certificate of the initializing software application and/or of the software client application.

10. A non-transitory computer-readable medium having processor-executable instructions stored thereon for distribution of a software client application, using a telecommunications network, to a client computing device, wherein the processor-executable instructions, when executed, facilitate:
requesting, by an enabling software application of the client computing device, an initializing software application from a first server entity, wherein the enabling software application is independent of a user-specific configuration for software as a service (SaaS) applications; receiving, by the client computing device, the initializing software application from the first server entity, wherein the initializing software application corresponds to a preliminary part of the software client application;

and downloading, by the client computing device, based on a request from the initializing software application, software code of the software client application for installing and/or Response to Office Action dated Mar. 23, 2020 application Ser. No. 15/794,009 activating the software client application on the client computing device, wherein the software client application facilitates provision of an SaaS service to the client computing device;

wherein transmission of the initializing software application to the client computing device is based on the hardware and/or software configuration of the client computing device, and wherein the hardware and/or software configuration of the client computing device is checked by the enabling software application, wherein the processor-executable instructions, when executed, further facilitate: performing, by the enabling software application, prior to an installation and/or activation of the initializing software application and/or the software client application, an authentication of the initializing software application and/or of the software client application, wherein the authentication is performed based on an application certificate of the initializing software application and/or of the software client application.

* * * * *